United States Patent
Xiong

(10) Patent No.: US 12,363,764 B2
(45) Date of Patent: Jul. 15, 2025

(54) METHOD FOR DETECTING TERMINAL DEVICE IN IDLE STATE, AND RELATED DEVICE

(71) Applicant: HUAWEI TECHNOLOGIES CO., LTD., Guangdong (CN)

(72) Inventor: Jing Xiong, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 451 days.

(21) Appl. No.: 17/748,651

(22) Filed: May 19, 2022

(65) Prior Publication Data

US 2022/0279598 A1 Sep. 1, 2022

Related U.S. Application Data

(63) Continuation of application No. PCT/CN2020/129991, filed on Nov. 19, 2020.

(30) Foreign Application Priority Data

Nov. 20, 2019 (CN) .......................... 201911144234.2

(51) Int. Cl.
*H04W 4/00* (2018.01)
*H04W 72/0446* (2023.01)
(Continued)

(52) U.S. Cl.
CPC ... *H04W 74/0841* (2013.01); *H04W 72/0446* (2013.01); *H04W 74/0866* (2013.01); *H04W 76/20* (2018.02); *H04W 76/30* (2018.02)

(58) Field of Classification Search
CPC .. H04W 74/08; H04W 76/30; H04W 72/0446
See application file for complete search history.

(56) References Cited

U.S. PATENT DOCUMENTS 11,516,735 B2 * 11/2022 Thangarasa ........... H04W 76/28
2005/0239461 A1 * 10/2005 Verma ............... H04W 36/1446
455/433

(Continued)

FOREIGN PATENT DOCUMENTS

| CN | 102123436 A | 7/2011 |
| CN | 102740366 A | 10/2012 |

(Continued)

OTHER PUBLICATIONS

ITRI ,"RRC State Transition between Connected and Inactive," 3GPPTSG-RAN WG2 Meeting #97, R2-1701343, Athens, Greece, Feb. 13-17, 2017, 4 pages.

(Continued)

*Primary Examiner* — Elisabeth Benoit Magloire
(74) *Attorney, Agent, or Firm* — Fish & Richardson P.C.

(57) ABSTRACT

Embodiments of this application disclose a method for detecting a terminal device in an idle state and a related device. The method includes: sending a first system message, where the first system message includes a first field, and the first field is used to indicate the terminal device in the idle state to periodically initiate random access; and receiving a random access request sent by the terminal device in the idle state, so that the terminal device in the idle state enters a connected state. The network device sends, to the terminal device, the first system message that carries the first field, and the terminal device in the idle state may periodically initiate random access to the network device, to connect the terminal device and the network device. The network device learns, in this way, whether a terminal device exists in a current coverage area.

17 Claims, 6 Drawing Sheets

(51) Int. Cl.
    *H04W 74/08*     (2009.01)
    *H04W 74/0833*     (2024.01)
    *H04W 76/20*     (2018.01)
    *H04W 76/30*     (2018.01)

(56) References Cited

U.S. PATENT DOCUMENTS

| | | | |
|---|---|---|---|
| 2012/0282956 | A1* | 11/2012 | Kim .................. H04W 4/70 455/466 |
| 2013/0281076 | A1 | 10/2013 | Damnjanovic et al. |
| 2014/0192690 | A1 | 7/2014 | Chakraborty et al. |
| 2017/0135134 | A1* | 5/2017 | Rune ................ H04W 74/0833 |
| 2017/0265165 | A1* | 9/2017 | Li ..................... H04W 72/0453 |
| 2018/0324679 | A1* | 11/2018 | Basu Mallick ....... H04W 48/10 |
| 2019/0028905 | A1* | 1/2019 | Veeramallu .......... H04W 76/18 |
| 2019/0059112 | A1* | 2/2019 | Ou ................... H04W 74/0833 |
| 2019/0182665 | A1* | 6/2019 | Edge ..................... H04W 24/10 |
| 2020/0119800 | A1* | 4/2020 | Rune .................. H04W 72/046 |
| 2020/0245228 | A1* | 7/2020 | Rune .................... H04B 7/0871 |
| 2020/0359425 | A1* | 11/2020 | Chen ..................... H04W 76/11 |
| 2021/0219163 | A1* | 7/2021 | Sha ........................ H04W 76/18 |
| 2021/0385869 | A1* | 12/2021 | Hong ................ H04W 74/0836 |

FOREIGN PATENT DOCUMENTS

| | | |
|---|---|---|
| CN | 105850164 A | 8/2016 |
| CN | 107018497 A | 8/2017 |
| CN | 107249221 A | 10/2017 |
| CN | 108633101 A | 10/2018 |
| CN | 109429318 A | 3/2019 |
| CN | 109462839 A | 3/2019 |
| EP | 2443877 A1 | 4/2012 |
| EP | 3490320 A1 | 5/2019 |
| WO | 2014120668 A1 | 8/2014 |
| WO | 2017149480 A1 | 9/2017 |
| WO | 2019032024 A1 | 2/2019 |

OTHER PUBLICATIONS

Lingjie, "Research on Improving Signaling Load in LTE System," Master Thesis, University of Electronic Science and Technology of China, Mar. 15, 2016, 89 pages (with English abstract).

Office Action issued in Chinese Application No. 201911144234.2 on Apr. 1, 2022, 7 pages (with English translation).

PCT International Search Report and Written Opinion issued in International Application No. PCT/CN2020/129991 on Feb. 3, 2021, 15 pages (with English translation).

LG Electronics Inc., "RAN Initiated Notification in RRC_Inactive," 3GPP TSG-RAN WG2 #96, R2-168414, Reno, USA, Aug. 14-18, 2016, 3 pages.

Extended European Search Report in European Appln No. 20889601.9, dated Dec. 20, 2022, 10 pages.

\* cited by examiner ions No. 201911144234.2, filed on Nov. 20, 2019.
METHOD FOR DETECTING TERMINAL DEVICE IN IDLE STATE, AND RELATED DEVICE

CROSS-REFERENCE TO RELATED APPLICATIONS

This application is a continuation of International Application No. PCT/CN2020/129991, filed on Nov. 19, 2020. The International Application claims priority to Chinese Application No. 201911144234.2, filed on Nov. 20, 2019. The disclosures of the aforementioned applications are hereby incorporated by reference in their entireties.

TECHNICAL FIELD

This application relates to the field of communication technologies, and in particular, to a method for detecting a terminal device in an idle state, and a related device.

BACKGROUND

Mobile communication is rapidly developed and popularized globally, and a wireless network has covered most areas, to meet people's requirements and enrich people's lives. Most network devices are deployed outdoors. Due to impact of propagation of a radio signal, an indoor coverage effect of the radio signal is usually worse than an outdoor coverage effect.

Currently, an indoor coverage networking solution is used, to resolve the foregoing problem. For example, an indoor area of a medium-large building usually reaches 20000 square meters to 50000 square meters, or even 100000 square meters. To complete such an indoor coverage networking solution, dozens or hundreds of required micro network devices such as a pico remote radio unit (pico remote radio unit, pRRU) need to be deployed. These micro network devices (or referred to as headends) serve as relays, to provide a communication service for each terminal device, which is also referred to as user equipment (user equipment, UE).

For some micro network devices that do not need to provide a communication service, for example, when no terminal device exists in a coverage area of the network device, because the network device currently cannot sense whether a terminal device exists in the coverage area, the network device usually needs to keep running uninterruptedly. Consequently, a huge amount of unnecessary energy consumption is generated.

SUMMARY

An embodiment of this application provides a method for detecting a terminal device in an idle state. A network device sends, to the terminal device, a first system message that carries a first field, and the terminal device in the idle state may periodically initiate random access to the network device, to connect the terminal device and the network device. The network device learns, in this way, whether a terminal device exists in a current coverage area.

According to a first aspect, an embodiment of this application provides a method for detecting a terminal device in an idle state. The method is applied to a network device, and specifically includes:

First, the network device sends a first system message to the terminal device. The first system message includes a first field, the first field is used to indicate the terminal device in the idle state to periodically initiate random access, and the first system message may be specifically a system information block (system information block, SIB), for example, an SIB 1, an SIB 2, or an SIB 3. Then, the network device receives a random access request sent by the terminal device in the idle state, so that the terminal device in the idle state enters a connected state.

In this embodiment of this application, the network device adds a new field to a system message, and broadcasts the system message (namely, the first system message) to the terminal device, so that the terminal device that receives the first system message may periodically establish a connection to the network device (in other words, the terminal device periodically initiates random access). The terminal device in the idle state may periodically initiate random access to the network device, to connect the terminal device and the network device.

Optionally, in some possible implementations, the first field specifically includes a first time period identifier, and the first time period identifier is used to indicate the terminal device to send the random access request to the network device at an interval of a first time period. The first field may be specifically "reportInterval".

Optionally, in some possible implementations, after receiving the random access request sent by the terminal device in the idle state, so that the terminal device in the idle state enters the connected state, the method further includes: sending a first instruction to the terminal device, where the first instruction is used to indicate the terminal device in the connected state to enter the idle state.

Optionally, in some possible implementations, the first system message further includes a second field, the second field includes a second time period identifier, and the second field is used to indicate that duration in which the terminal device remains in the connected state after random access succeeds is a second time period. The second field may be specifically "sTayDuration".

Optionally, in some possible implementations, after receiving the random access request sent by the terminal device in the idle state, so that the terminal device in the idle state enters the connected state, the method further includes: sending a first instruction to the terminal device based on the second time period identifier after the terminal device enters the connected state for the second time period, where the first instruction is used to indicate the terminal device in the connected state to enter the idle state.

Optionally, in some possible implementations, after receiving the random access request sent by the terminal device in the idle state, so that the terminal device in the idle state enters the connected state, the method further includes: receiving, based on the second time period identifier after the terminal device enters the connected state for the second time period, a second instruction sent by the terminal device, where the second instruction is used to indicate the network device to release the terminal device in the connected state, to enable the terminal device to enter the idle state.

Optionally, in some possible implementations, the random access request further includes a third field, and the third field is used to indicate the network device to release the terminal device in the connected state after the terminal device enters the connected state for a third time period, to enable the terminal device to enter the idle state.

According to a second aspect, an embodiment of this application provides a method for detecting a terminal device in an idle state. The method is applied to a terminal device, and specifically includes:

First, the terminal device receives a first system message. The first system message includes a first field, the first field is used to indicate the terminal device in the idle state to periodically initiate random access, and the first system message may be specifically a system information block (system information block, SIB), for example, an SIB 1, an SIB 2, or an SIB 3.

Then, the terminal device in the idle state sends a random access request to the network device based on the first field, so that the terminal device in the idle state enters a connected state.

In this embodiment of this application, the network device adds a new field to a system message, and broadcasts the system message (namely, the first system message) to the terminal device, so that the terminal device that receives the first system message may periodically establish a connection to the network device (in other words, the terminal device periodically initiates random access). The terminal device in the idle state may periodically initiate random access to the network device, to connect the terminal device and the network device.

Optionally, in some possible implementations, that the terminal device in the idle state sends a random access request to the network device based on the first field specifically includes: The terminal device in the idle state sends the random access request to the network device at an interval of a first time period based on a first time period identifier. The first field includes the first time period identifier. The first field may be specifically "reportInterval".

Optionally, in some possible implementations, after the terminal device in the idle state sends the random access request to the network device, so that the terminal device in the idle state enters the connected state, the method further includes: The terminal device receives a first instruction sent by the network device; and the terminal device in the connected state enters the idle state according to the first instruction.

Optionally, in some possible implementations, the first system message further includes a second field, the second field includes a second time period identifier, and the second field is used to indicate that duration in which the terminal device remains in the connected state after random access succeeds is a second time period. The second field may be specifically "sTayDuration".

Optionally, in some possible implementations, after the terminal device in the idle state sends the random access request to the network device based on the first field, the method further includes: receiving a first instruction sent by the network device, where the first instruction is used to indicate the terminal device in the connected state to enter the idle state.

Optionally, in some possible implementations, after the terminal device in the idle state sends the random access request to the network device based on the first field, the method further includes: sending a second instruction to the network device based on the second time period identifier after the terminal device enters the connected state for the second time period, where the second instruction is used to indicate the network device to release the terminal device in the connected state, to enable the terminal device to enter the idle state.

Optionally, in some possible implementations, the random access request further includes a third field, and the third field is used to indicate the network device to release the terminal device in the connected state after the terminal device enters the connected state for a third time period, to enable the terminal device to enter the idle state.

According to a third aspect, an embodiment of this application provides a network device. The network device has a function of implementing behavior of the network device in the first aspect. The function may be implemented by hardware, or may be implemented by hardware executing corresponding software. The hardware or the software includes one or more modules corresponding to the function.

For example, the network device includes: a sending module, configured to send a first system message, where the first system message includes a first field, and the first field is used to indicate a terminal device in an idle state to periodically initiate random access; and a receiving module, configured to receive a random access request sent by the terminal device in the idle state, so that the terminal device in the idle state enters a connected state.

Optionally, the network device further includes a storage module, configured to store program instructions and data that are necessary for the terminal device.

In a possible implementation, the apparatus includes a processor and a transceiver. The processor is configured to support the network device to perform a corresponding function in the method provided in the first aspect. The transceiver is configured to: indicate communication between the network device and the terminal device, and send corresponding information or instructions in the foregoing method to the network device. Optionally, the apparatus may further include a memory. The memory is configured to be coupled to the processor, and the memory stores program instructions and data that are necessary for the network device.

In a possible implementation, when the network device is a chip in the network device, the chip includes a processor and a transceiver unit. The processor is configured to send, based on a second time period identifier, a first instruction to the terminal device after the terminal device enters the connected state for a second time period. The first instruction is used to indicate the terminal device in the connected state to enter the idle state. The transceiver unit may be, for example, an input/output interface, a pin, or a circuit on the chip, and transmits the first system message to another chip or module coupled to the chip. The processing module may execute computer-executable instructions stored in a storage unit, to support the network device to perform the method provided in the first aspect. Optionally, the storage unit may be a storage unit in the chip, for example, a register or a cache. The storage unit may alternatively be a storage unit outside the chip, for example, a read-only memory (read-only memory, ROM), another type of static storage device that can store static information and instructions, or a random access memory (random access memory, RAM).

In a possible implementation, the network device includes a processor, a baseband circuit, a radio frequency circuit, and an antenna. The processor is configured to control a function of each circuit part. The baseband circuit is configured to generate a data packet, and the radio frequency circuit performs processing such as analog conversion, filtering, amplification, and up-conversion, and then sends the data packet to the terminal device through the antenna. Optionally, the apparatus further includes a memory, and the memory stores program instructions and data that are necessary for the network device.

The processor may be a general-purpose central processing unit (Central Processing Unit, CPU), a microprocessor, an application-specific integrated circuit (application-specific integrated circuit, ASIC), or one or more integrated circuits configured to control program execution of the data transmission method in the foregoing aspects.

According to a fourth aspect, an embodiment of this application provides a terminal device. The terminal device has a function of implementing behavior of the terminal device in the second aspect. The function may be implemented by hardware, or may be implemented by hardware executing corresponding software. The hardware or the software includes one or more modules corresponding to the function.

For example, the terminal device includes: a receiving module, configured to receive a first system message, where the first system message includes a first field, and the first field is used to indicate the terminal device in an idle state to periodically initiate random access; and a sending module, configured to send, by the terminal device in the idle state, a random access request to a network device based on the first field, so that the terminal device in the idle state enters a connected state.

Optionally, the network device further includes a storage module, configured to store program instructions and data that are necessary for the terminal device.

In a possible implementation, the apparatus includes a processor and a transceiver, and the processor is configured to support the terminal device to perform a corresponding function in the method provided in the second aspect. The transceiver is configured to: indicate communication between terminal devices, and send corresponding information or instructions in the foregoing method to the terminal device. Optionally, the apparatus may further include a memory. The memory is configured to be coupled to the processor, and the memory stores program instructions and data that are necessary for the terminal device.

In a possible implementation, when the terminal device is a chip in the terminal device, the chip includes a processor and a transceiver unit. The processor is configured to send, by the terminal device in the idle state, the random access request to the network device at an interval of a first time period based on a first time period identifier, where the first field includes the first time period identifier. The transceiver unit may be, for example, an input/output interface, a pin, or a circuit on the chip, and transmits the first system message to another chip or module coupled to the chip. The processor may execute computer-executable instructions stored in a storage unit, to support the terminal device to perform the method provided in the second aspect. Optionally, the storage unit may be a storage unit in the chip, for example, a register or a cache. The storage unit may alternatively be a storage unit outside the chip, for example, a read-only memory (read-only memory, ROM), another type of static storage device that can store static information and instructions, or a random access memory (random access memory, RAM).

In a possible implementation, the terminal device includes a processor, a baseband circuit, a radio frequency circuit, and an antenna. The processor is configured to control a function of each circuit part. The baseband circuit is configured to generate a data packet, and the radio frequency circuit performs processing such as analog conversion, filtering, amplification, and up-conversion, and then sends the data packet to the terminal device through the antenna. Optionally, the apparatus further includes a memory, and the memory stores program instructions and data that are necessary for the terminal device.

The processor may be a general-purpose central processing unit (Central Processing Unit, CPU), a microprocessor, an application-specific integrated circuit (application-specific integrated circuit, ASIC), or one or more integrated circuits configured to control program execution of the data transmission method in the foregoing aspects.

According to a fifth aspect, an embodiment of this application provides a computer-readable storage medium. The computer storage medium stores computer instructions, and the computer instructions are used to perform the method in any possible implementation of the first aspect.

According to a sixth aspect, an embodiment of this application provides a computer program product including instructions. When the computer program product runs on a computer, the computer is enabled to perform the method in any possible implementation of the first aspect.

According to a seventh aspect, an embodiment of this application provides a computer-readable storage medium. The computer storage medium stores computer instructions, and the computer instructions are used to perform the method in any possible implementation of the second aspect.

According to an eighth aspect, an embodiment of this application provides a computer program product including instructions. When the computer program product runs on a computer, the computer is enabled to perform the method in any possible implementation of the second aspect.

According to a ninth aspect, an embodiment of this application provides a communication system. The system includes the network device and the terminal device in the foregoing aspects.

It can be learned from the foregoing technical solutions that embodiments of this application have the following advantages:

The network device sends the first system message to the terminal device, where the first system message includes the first field, and the first field is used to indicate the terminal device in the idle state to periodically initiate random access; and receives the random access request sent by the terminal device in the idle state, so that the terminal device in the idle state enters the connected state. The network device sends, to the terminal device, the first system message that carries the first field, and the terminal device in the idle state may periodically initiate random access to the network device, to connect the terminal device and the network device. The network device learns, in this way, whether a terminal device exists in a current coverage area.

DESCRIPTION OF EMBODIMENTS

Figure 1:
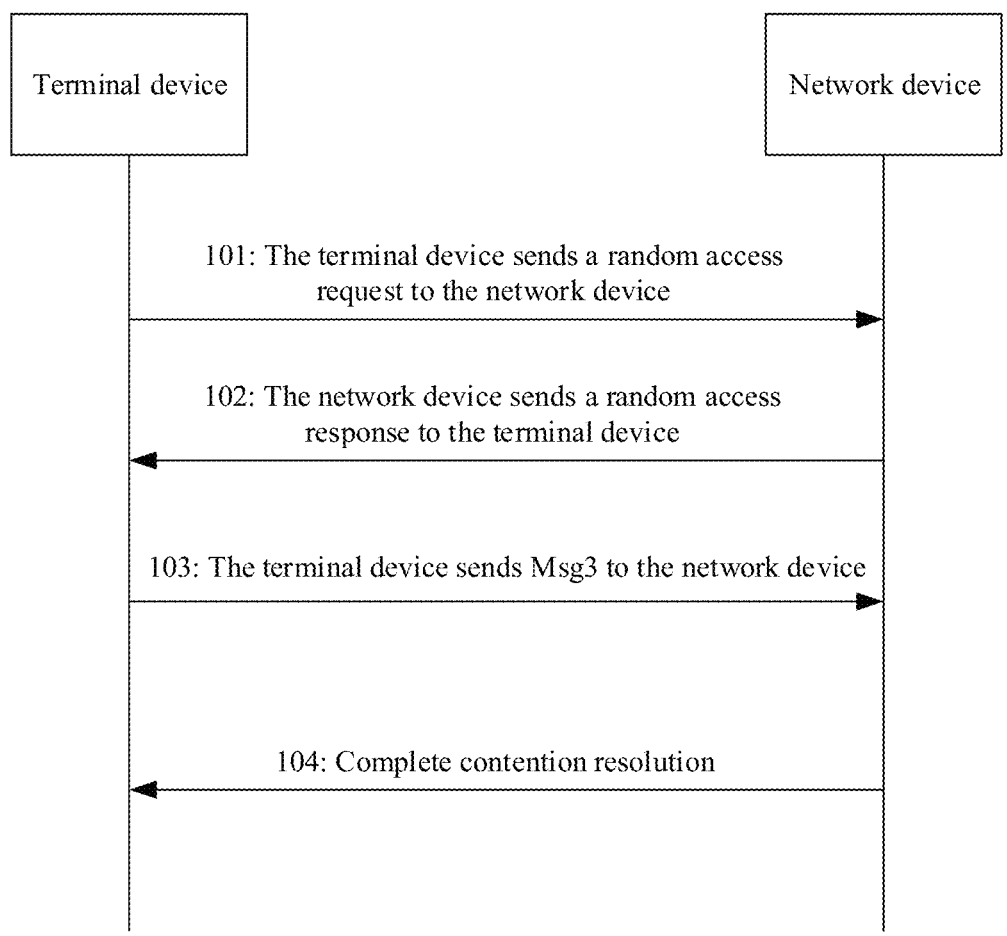
FIG. 1 is a schematic diagram of random access.

An embodiment of this application provides a method for detecting a terminal device in an idle state. A network device sends, to the terminal device, a first system message that carries a first field, and the terminal device in the idle state may periodically initiate random access to the network device, to connect the terminal device and the network device. The network device learns, in this way, whether a terminal device exists in a current coverage area.

The following describes embodiments of this application with reference to the accompanying drawings. A person of ordinary skill in the art may learn that the technical solutions provided in embodiments of this application are also applicable to a similar technical problem as a technology evolves and a new scenario emerges.

In the specification, claims, and accompanying drawings of this application, the terms "first", "second", and the like are intended to distinguish between similar objects, but do not necessarily indicate a specific order or sequence. It should be understood that the terms used in such a way are interchangeable in proper circumstances, and this is merely a distinguishing manner that is used when objects having a same attribute are described in embodiments of this application. In addition, the terms "include", "have", and any other variants thereof are intended to cover a non-exclusive inclusion, so that a process, method, system, product, or device that includes a series of units is not limited to those units, but may include other units not expressly listed or inherent to such a process, method, product, or device.

Embodiments of this application may be applied to a plurality of communication systems, including but not limited to a global system for mobile communications (Global System for Mobile Communications, GSM), a code division multiple access (Code Division Multiple Access, CDMA) system, a wideband code division multiple access (Wideband Code Division Multiple Access, WCDMA) system, a general packet radio service (general packet radio service, GPRS) system, a long term evolution (Long Term Evolution, LTE) system, a frequency division duplex long term evolution (frequency division duplex LTE, LTE-FDD) system, a time division duplex long term evolution (time division duplex LTE, LTE-TDD) system, a universal mobile telecommunications system (Universal Mobile Telecommunications System, UMTS), another wireless communication system in which an orthogonal frequency division multiplexing (orthogonal frequency division multiplexing, OFDM) technology is used, a fifth generation (5th generation, 5G) communication systems in development, and any future communication system that may be applied.

The terminal device in embodiments of this application may include various handheld devices, vehicle-mounted devices, wearable devices, or computing devices that have a wireless communication function, or other processing devices connected to a wireless modem. The terminal may be a mobile station (mobile station, MS), a subscriber module (subscriber unit), a cellular phone (cellular phone), a smartphone (smartphone), a wireless data card, a personal digital assistant (personal digital assistant, PDA for short) computer, a tablet computer, a wireless modem (modem), a handheld device (handset), a laptop computer (laptop computer), a machine type communication (machine type communication, MTC) terminal, or the like.

The network device in embodiments of this application may be a base station (base station, BS), a NodeB, or an evolved NodeB (evolved node base station, eNB), or may be a gNodeB (gNB), a transmission point (transmission point, TP), or a Wi-Fi access point (access point, AP) in a 5G system (or referred to as a new radio (new radio, NR) system). Certainly, the network device may alternatively be another network device that has similar base station functions and that can send control information to the terminal device.

How a terminal device in an idle state initiates random access to a network device is first described. FIG. 1 is a schematic diagram of random access.

101: The terminal device sends a random access request to a network device.

In step 101, the terminal device in the idle state sends the random access request to the network device. Specifically, the terminal device selects a random access preamble (random access preamble) and a physical random access channel (physical random access channel, PRACH) resource, and sends the selected random access preamble to the network device on the PRACH resource. In addition to the random access preamble, the terminal device further sends data such as an identifier (namely, a UE ID) of the terminal device and a small data packet. The terminal device determines the random access preamble (random access preamble) and the physical random access channel (physical random access channel, PRACH) resource, and sends the selected random access preamble to the network device on the PRACH resource.

102: The network device sends a random access response to the terminal device.

In step 102, the network device sends the random access response (random access response, RAR) to the terminal device.

The network device receives the random access preamble, and sends the random access response (Random Access Response, RAR) to the terminal device. The RAR carries a timing advance (timing advance, TA), and the timing advance is obtained by the network device by detecting the random access preamble. The terminal device adjusts uplink timing by using the TA. A signaling length of the TA is 12 bits, and may represent $\{0, 1, 2, \ldots, 3846\}$. An adjustment value that may be represented by the TA is $1664/(2480*103*4096)$. When a subcarrier width is 15 kilohertz, the TA may represent a maximum length of 2 milliseconds and can only represent a positive value.

The random access response further includes a cell radio network temporary identifier (cell-radio network temporary identifier, C-RNTI) or a temporary cell radio network temporary identifier (temporary cell-radio network temporary identifier, TC-RNTI) allocated by the network device. The random access response includes one or more types of information such as the timing advance, power control information, and a time and frequency resource configuration.

103: The terminal device sends Msg3 to the network device.

In step 103, the terminal device sends Msg3 (First scheduled UL transmission on UL-SCH) to the network device. The terminal device adjusts the uplink timing based on the timing advance in the random access response, and transmits Msg3 on an uplink resource allocated by the network device to the terminal device, to perform subsequent data transmission.

Msg3 may carry a radio resource control connection establishment message (radio resource control connection request), or may carry a radio resource control connection re-establishment message (radio resource control connection re-establishment request). Msg3 carries a contention resolution identity (ue contention resolution identity) of the terminal device, to complete final contention resolution.

104: Complete contention resolution.

In step 104, the network device delivers Msg4 to the terminal device. The terminal device completes contention resolution based on Msg4. The terminal enters a connected state.

Figure 2:
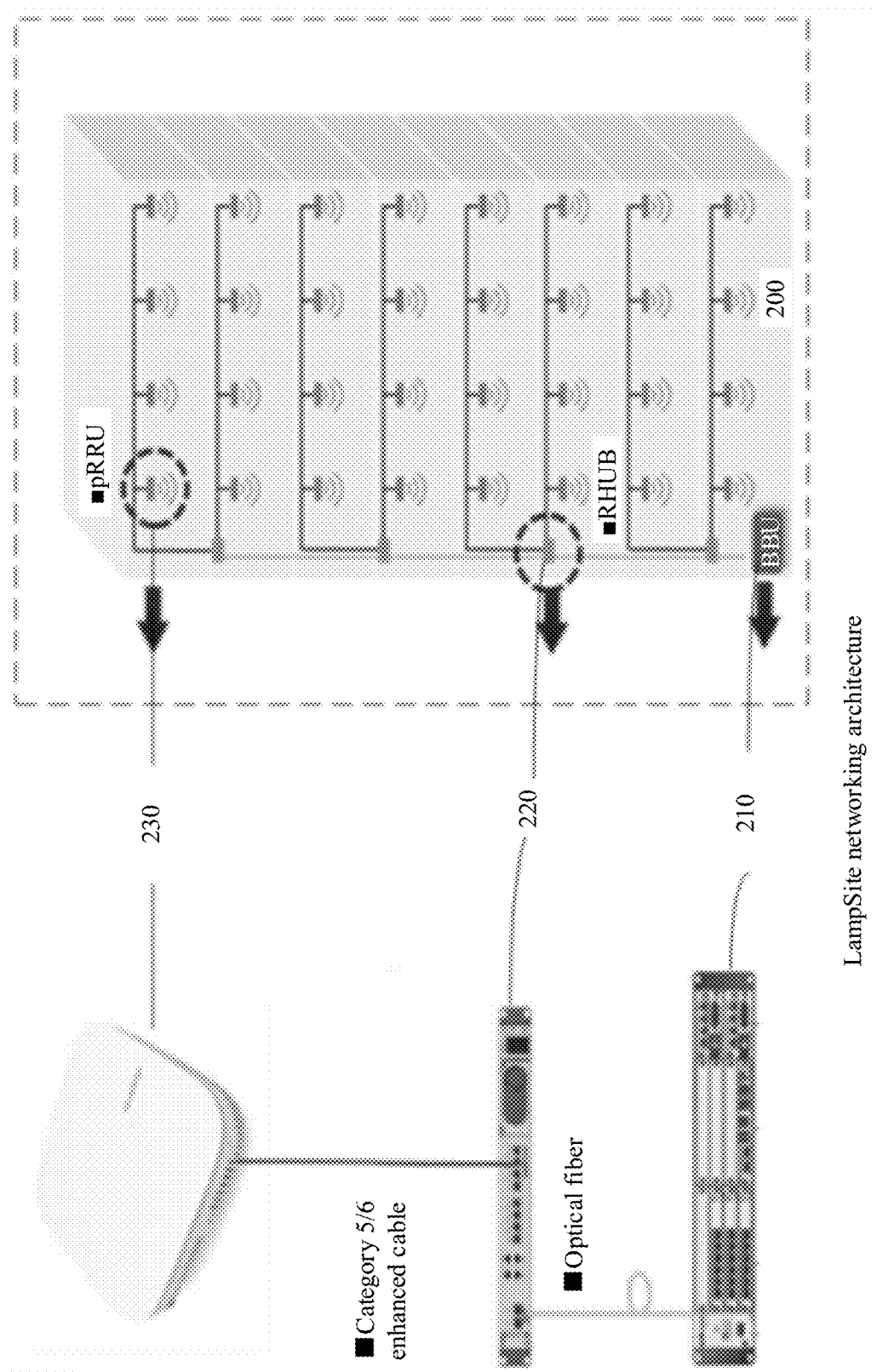
FIG. 2 is a schematic diagram of a topology of an indoor coverage networking solution to which an embodiment of this application is applicable.

Then, an application scenario to which this application is applicable is described. Currently, a common indoor coverage networking solution is shown in FIG. 2. FIG. 2 is a schematic diagram of a topology of an indoor coverage networking solution to which an embodiment of this application is applicable. The indoor coverage networking solution shown in FIG. 2 is also referred to as a "LampSite architecture". In this architecture, a control device is specifically a baseband unit, a convergence device (optional) is specifically a remote radio unit hub, and an access device is specifically a micro remote radio unit. As shown in FIG. 2, a typical LampSite architecture 200 includes a baseband unit (baseband unit, BBU) 210, a remote radio unit hub (remote radio unit hub, RHUB) 220, and a plurality of pico remote radio units (pico remote radio unit, pRRU) 230. The RHUB 220 and the BBU 210 are connected by using a fiber, and the pRRU 230 and the RHUB 220 are connected by using a cable. Specifically, the pRRU 230 may support a plurality of frequency bands and a plurality of modes, can simultaneously support various communication systems, and is configured to implement conversion from an intermediate frequency signal to a radio frequency signal, so that the radio frequency signal can be transmitted in a specified frequency band. The RHUB 220 is configured to: cascade or combine data transmitted by the pRRU, and then transmit the data to the BBU 210. The BBU 210 is mainly configured to implement functions of a physical layer, a media access control (media access control, MAC) layer, and an L3 layer.

Figure 3:
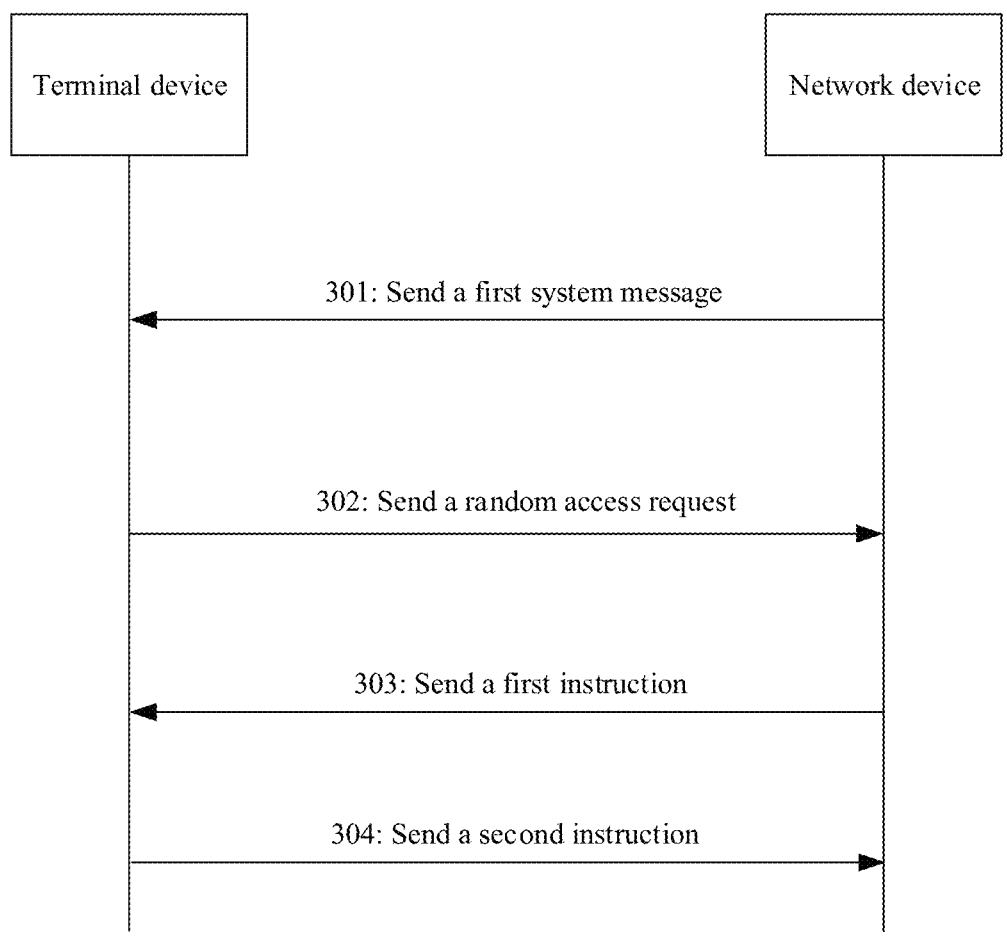
FIG. 3 is a schematic flowchart of an embodiment of a method for detecting a terminal device in an idle state according to an embodiment of this application.

The following describes embodiments of this application with reference to the accompanying drawings. FIG. 3 is a schematic flowchart of an embodiment of a method for detecting a terminal device in an idle state according to an embodiment of this application. The method for detecting a terminal device in an idle state in this embodiment of this application includes the following steps.

301: Send a first system message.

In this embodiment, a network device sends the first system message to the terminal device. Specifically, the network device may broadcast and send the first system message to a current coverage area of the network device. Regardless of whether the terminal device is in a connected state or in the idle state, the terminal device monitors a paging channel (paging channel). The network device may send the first system message to the terminal device through the paging channel.

The first system message may be specifically a system information block (system information block, SIB), for example, an SIB 1, an SIB 2, or an SIB 3. There may be two different possible cases of the first system message: (1) The first system message includes a first field. (2) The first system message includes a first field and a second field. The following gives respective descriptions.

(1) The First System Message Includes the First Field.

The first system message includes the first field, and the first field is used to indicate the terminal device in the idle state to periodically initiate random access. The first field may be specifically "reportInterval", the first field specifically includes a first time period identifier, and the first time period identifier is used to indicate the terminal device to send a random access request to the network device at an interval of a first time period.

The first time period identifier may be one or more time values in {1, 2, 4, 8, 16, 32, 64, 128, 256, 512, 1024, 2048}, and a value range of the first time period identifier is not limited herein. For example, when the first time period identifier in the first field included in the first system message is "1" (unit: second), the terminal device that receives the first system message initiates random access to the network device at an interval of 1 second based on the first time period identifier "1". A method in which the terminal device initiates random access may be: The terminal device sends the random access request to the network device; and when the first time period identifier in the first field included in the first system message is "32" (unit: second), the terminal device that receives the first system message initiates random access to the network device at an interval of 32 seconds based on the first time period identifier "32".

The first time period identifier may alternatively be a plurality of time values. In this case, the terminal device selects, based on the first time period identifier and an energy consumption status of the terminal device, a time value from the plurality of time values included in the first time period identifier. The time value is used as the first time period. The terminal device sends the random access request to the network device at an interval of the time value. For example, the first time period identifier is "1, 128". When a remaining battery level of the terminal device is greater than 50%, the terminal device selects a time value "1", and the terminal device initiates random access to the network device at an interval of 1 second. When a remaining battery level of the terminal device is less than or equal to 50%, the terminal device selects a time value "128", and the terminal device initiates random access to the network device at an interval of 128 seconds.

In an optional implementation, content of the first field may be represented in the first system message in the following form:

```
"SIB1 ::=   SEQUENCE {
    frequencyOffsetSSB ENUMERATED {khz-5, khz5} OPTIONAL,
-- Need R
    ...
    Periodic-AccessConfigCommon::=           SEQUENCE {
    reportInterval                           ENUMERATED
    (1,2,4,8,16,32,64,128,256,512,1024,2048)
    }"
```

(2) The First System Message Includes the First Field and the Second Field.

The first system message includes the first field and the second field, and related information of the first field is not described herein again. The second field may be specifically "sTayDuration", and the second field specifically includes a second time period identifier. The second field is used to indicate that duration in which the terminal device remains in the connected state after random access succeeds is a second time period.

The second time period identifier may be one or more time values in {1, 2, 4, 8, 16}, and a value range of the second time period identifier is not limited herein. For example, when the second time period identifier in the second field included in the first system message is "1" (unit: second), after the terminal device successfully performs random access, duration in which the terminal device remains in the connected state is 1 second based on the second time period identifier "1". After the terminal device remains in the connected state for 1 second, the terminal device is disconnected from the network device, and the terminal device enters the idle state.

In an optional implementation, content of the first field and the second field may be represented in the first system message in the following form:

```
"SIB1 ::=   SEQUENCE {
    frequencyOffsetSSB ENUMERATED {khz-5, khz5} OPTIONAL,
-- Need R
    ...
    Periodic-AccessConfigCommon::=   SEQUENCE {
    reportInterval                   ENUMERATED
(1,2,4,8,16,32,64,128,256,512,1024,2048)
    sTayDuration                     ENUMERATED {1,2,4,8,16}
    }"
```

302: Send the random access request.

In this embodiment, after receiving the first system message, the terminal device initiates random access to the network device based on an indication of the first system message. Specifically, the terminal device sends the random access request to the network device.

After the terminal device sends the random access request to the network device, random access is performed between the terminal device and the network device. A specific random access procedure is similar to that in FIG. 1 and steps corresponding to FIG. 1. Details are not described herein again.

In an optional implementation, the random access request includes a third field, and the third field is used to indicate the network device to release the terminal device after the terminal device enters the connected state for a third time period, to enable the terminal device to enter the idle state. The third field may be a newly added field in a cause value in the random access request. In an existing random access request, the cause value includes "MO-DATA (data service access), MO-SIG (voice service access), Mt-Access (high-priority access), and Emergency (emergency incoming call) ". The cause value is used to indicate a reason why the terminal device initiates random access currently. When the random access request includes a third field, for example, "reportInterval (the third field)", after the network device obtains the random access request, the network device may learn of the reason why the terminal device initiates the random access, and perform a subsequent step.

After the terminal device establishes a connection to the network device through random access, in other words, after the terminal device enters the connected state from the idle state, the terminal device in the connected state needs to enter the idle state. In this case, the terminal device may actively send an instruction to the network device, so that the terminal device (the terminal device) enters the idle state from the connected state, as shown in step 304; or the terminal device may wait for an instruction from the network device, and enter the idle state from the connected state according to the instruction, as shown in step 303. The following gives respective descriptions.

303: Send a first instruction.

In this embodiment, the network device sends the first instruction to the terminal device, to trigger the terminal device in the connected state to enter the idle state. Specifically, corresponding to whether the first system message includes the second field, the network device sends the first instruction to the terminal device based on different reasons. The following provides separate descriptions.

(1) The First System Message Includes the First Field.

When the first system message includes the first field (does not include the second field) and the random access request does not include the third field, after the network device establishes a connection to the terminal device, in other words, after the terminal device enters the connected state from the idle state, the network device actively sends the first instruction to the terminal device, and the terminal device enters the idle state from the connected state according to the first instruction.

When the first system message includes the first field (does not include the second field) and the random access request includes the third field, after the network device establishes a connection to the terminal device, in other words, after the terminal device enters the connected state from the idle state, the terminal device starts a timer whose timing duration is the third time period. The third time period is a preset time period. A specific value range is not limited herein. For example, the third time period is "4" (unit: second). When the terminal device enters the connected state from the idle state, the network device starts a timer whose duration is 4 seconds. After 4 seconds, the network device sends the first instruction to the terminal device, to indicate the terminal device to enter the idle state from the connected state.

(2) The First System Message Includes the First Field and the Second Field.

When the first system message includes the first field and the second field, the network device may start, based on an indication of the second time period identifier in the second field after the terminal device establishes a connection to the network device (in other words, after the terminal device enters the connected state from the idle state), a timer whose timing duration is the second time period. For example, the second time period identifier in the second field of the first system message is "8" (unit: second). When the terminal device enters the connected state from the idle state, the network device starts a timer whose duration is 8 seconds. After 8 seconds, the network device sends the first instruction to the terminal device, to indicate the terminal device to enter the idle state from the connected state.

304: Send a second instruction.

In this embodiment, when the first system message includes the second field, after the terminal device enters the connected state from the idle state, the terminal device may further send the second instruction to the network device based on an indication of the second field, so that the terminal device enters the idle state from the connected state.

Specifically, when the first system message includes the first field and the second field, the terminal device may start, based on an indication of the second time period identifier in the second field after the terminal device establishes a connection to the network device (in other words, after the terminal device enters the connected state from the idle state), a timer whose timing duration is the second time period. For example, the second time period identifier in the second field of the first system message is "16" (unit: second). When the terminal device enters the connected state from the idle state, the terminal device starts a timer whose duration is 16 seconds. After 16 seconds, the terminal device sends the second instruction to the network device, to indicate the network device to release the terminal device, to enable the terminal device to enter the idle state from the connected state.

In this embodiment of this application, the network device adds a new field to a system message, and broadcasts the system message (namely, the first system message) to the terminal device, so that the terminal device that receives the first system message may periodically establish a connection to the network device (in other words, the terminal device periodically initiates random access). The terminal device in the idle state may periodically initiate random access to the network device, to connect the terminal device and the network device. The network device learns, in this way, whether a terminal device exists in a current coverage area. Further, the network device may further collect statistics about a person flow status in a current coverage area based on a quantity of terminal devices that establish a connection to the network device in the current coverage area.

The foregoing mainly describes the solutions provided in embodiments of this application from a perspective of the methods. It may be understood that, to implement the foregoing functions, the network device and the terminal device include corresponding hardware structures and/or software modules for performing the functions. A person skilled in the art should be easily aware that, with reference to modules and algorithm steps of each example described in embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, functional modules of the network device and the terminal device may be divided based on the foregoing method examples. For example, each functional module may be divided corresponding to each function, or two or more functions may be integrated into one receiving module. The integrated module may be implemented in a form of hardware, or may be implemented in a form of a software functional module. It should be noted that, in embodiments of this application, division into the modules is an example, and is merely logical function division. In an actual implementation, another division manner may be used.

Figure 4:
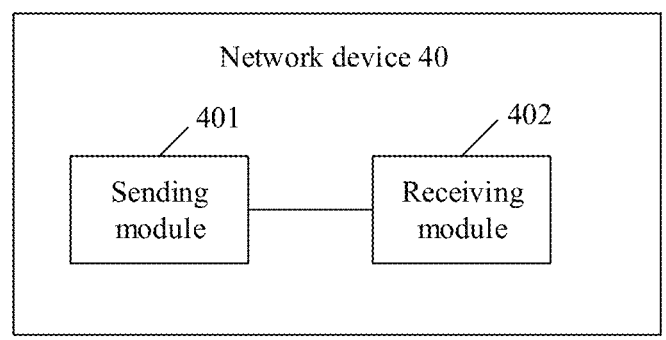
FIG. 4 is a schematic diagram of an embodiment of a network device according to an embodiment of this application.

The following describes the network device in this application in detail. FIG. 4 is a schematic diagram of an embodiment of a network device according to an embodiment of this application. A network device 40 includes:

- a sending module 401, configured to send a first system message, where the first system message includes a first field, and the first field is used to indicate a terminal device in an idle state to periodically initiate random access; and
- a receiving module 402, configured to receive a random access request sent by the terminal device in the idle state, so that the terminal device in the idle state enters a connected state.

In some embodiments of this application, the first field specifically includes a first time period identifier, and the first time period identifier is used to indicate the terminal device to send the random access request to the network device at an interval of a first time period.

In some embodiments of this application, the sending module 401 is further configured to send a first instruction to the terminal device. The first instruction is used to indicate the terminal device in the connected state to enter the idle state.

In some embodiments of this application, the first system message further includes a second field, the second field includes a second time period identifier, and the second field is used to indicate that duration in which the terminal device remains in the connected state after random access succeeds is a second time period.

In some embodiments of this application, the sending module 401 is further configured to send a first instruction to the terminal device based on the second time period identifier after the terminal device enters the connected state for the second time period. The first instruction is used to indicate the terminal device in the connected state to enter the idle state.

In some embodiments of this application, the receiving module 402 is further configured to receive, based on the second time period identifier after the terminal device enters the connected state for the second time period, a second instruction sent by the terminal device. The second instruction is used to indicate the network device to release the terminal device in the connected state, to enable the terminal device to enter the idle state.

In some embodiments of this application, the random access request further includes a third field, and the third field is used to indicate the network device to release the terminal device in the connected state after the terminal device enters the connected state for a third time period, to enable the terminal device to enter the idle state.

The network device in this embodiment may be configured to execute the technical solution in the method embodiment shown in FIG. 3. Implementation principles and technical effects thereof are similar, and are not described herein again.

Figure 5:
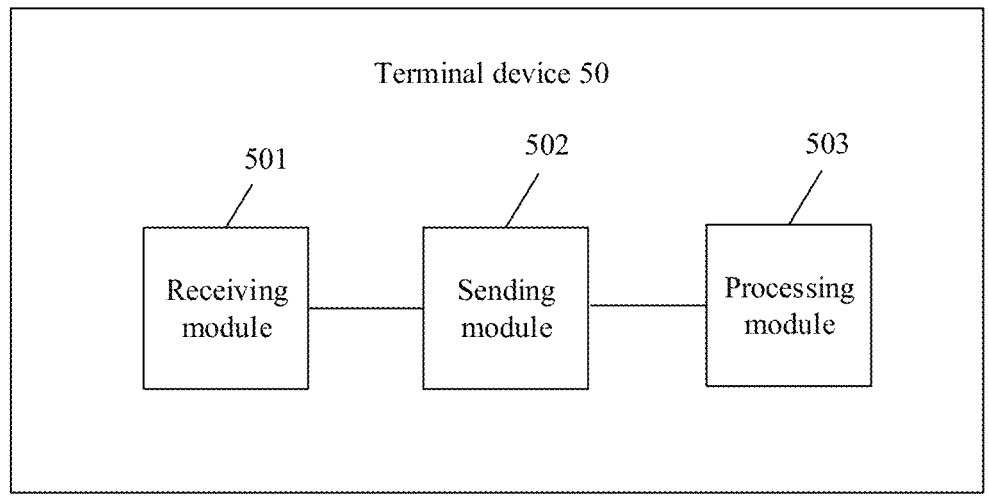
FIG. 5 is a schematic diagram of an embodiment of a terminal device according to an embodiment of this application.

FIG. 5 is a schematic diagram of an embodiment of a terminal device according to an embodiment of this application. A terminal device 50 includes:

- a receiving module 501, configured to receive a first system message, where the first system message includes a first field, and the first field is used to indicate the terminal device in an idle state to periodically initiate random access; and
- a sending module 502, configured to send, by the terminal device in the idle state, a random access request to a network device based on the first field, so that the terminal device in the idle state enters a connected state.

In some embodiments of this application, the sending module 502 is further configured to send, by the terminal device in the idle state, the random access request to the network device at an interval of a first time period based on a first time period identifier, where the first field includes the first time period identifier.

In some embodiments of this application, the receiving module 501 is further configured to receive a first instruction sent by the network device.

A processing module 503 is configured to enable, according to the first instruction, the terminal device in the connected state to enter the idle state.

In some embodiments of this application, the first system message further includes a second field, the second field includes a second time period identifier, and the second field is used to indicate that duration in which the terminal device remains in the connected state after random access succeeds is a second time period.

In some embodiments of this application, the receiving module 501 is further configured to receive a first instruction sent by the network device. The first instruction is used to indicate the terminal device in the connected state to enter the idle state.

In some embodiments of this application, the sending module 502 is further configured to send a second instruction to the network device based on the second time period identifier after the terminal device enters the connected state for the second time period. The second instruction is used to indicate the network device to release the terminal device in the connected state, to enable the terminal device to enter the idle state.

In some embodiments of this application, the random access request further includes a third field, and the third field is used to indicate the network device to release the terminal device in the connected state after the terminal device enters the connected state for a third time period, to enable the terminal device to enter the idle state.

The terminal device in this embodiment may be used to perform the technical solution of the method embodiment shown in FIG. 3. Implementation principles and technical effects thereof are similar, and are not described herein again.

Figure 6:
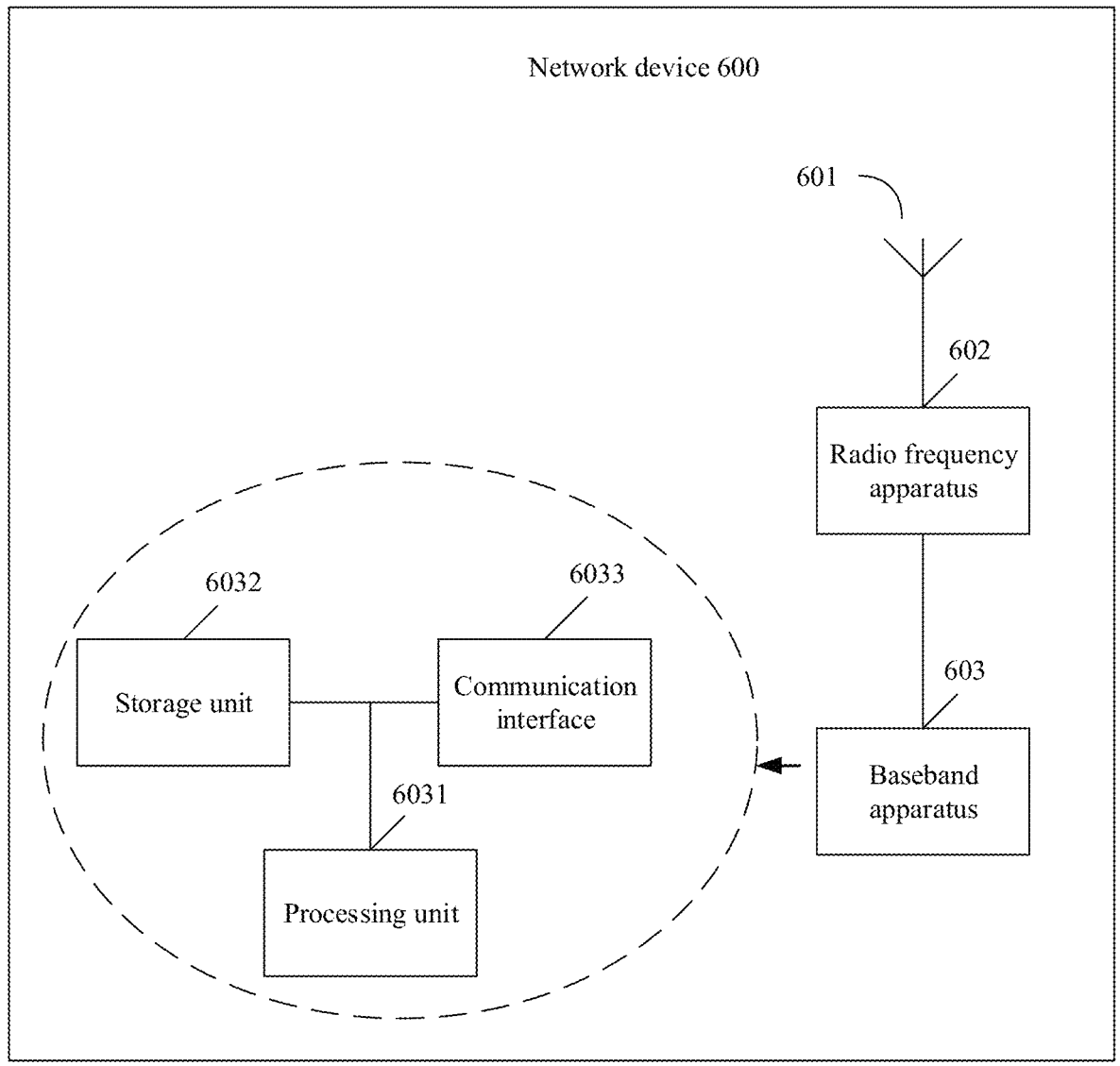
FIG. 6 is a schematic diagram of a structure of a network device according to an embodiment of this application.

FIG. 6 is a schematic diagram of a structure of a network device according to an embodiment of this application. As shown in FIG. 6, a network device 600 may be the network device in the foregoing embodiments. The network device 600 includes an antenna 601, a radio frequency apparatus 602, and a baseband apparatus 603. The antenna 601 is connected to the radio frequency apparatus 602. In an uplink direction, the radio frequency apparatus 602 receives a signal from a communication device through the antenna 601, and sends the received signal to the baseband apparatus 603 for processing. In a downlink direction, the baseband apparatus 603 generates a signal that needs to be sent to the communication device, and sends the generated signal to the radio frequency apparatus 602. The radio frequency apparatus 602 transmits the signal through the antenna 601.

The baseband apparatus 603 may include one or more processing units 6031. The processing unit 6031 may be specifically a processor.

In addition, the baseband apparatus 603 may further include one or more storage units 6032 and one or more communication interfaces 6033. The storage unit 6032 is configured to store a computer program and/or data. The communication interface 6033 is configured to exchange information with the radio frequency apparatus 602. The storage unit 6032 may be specifically a memory, and the communication interface 6033 may be an input/output interface or a transceiver circuit.

Optionally, the storage unit 6032 may be a storage unit located on a same chip as the processing unit 6031, that is, the storage unit 6032 is an on-chip storage unit; or may be a storage unit located on a different chip from the processing unit 6031, that is, the storage unit 6032 is an off-chip storage unit. This is not limited in this application.

Figure 7:
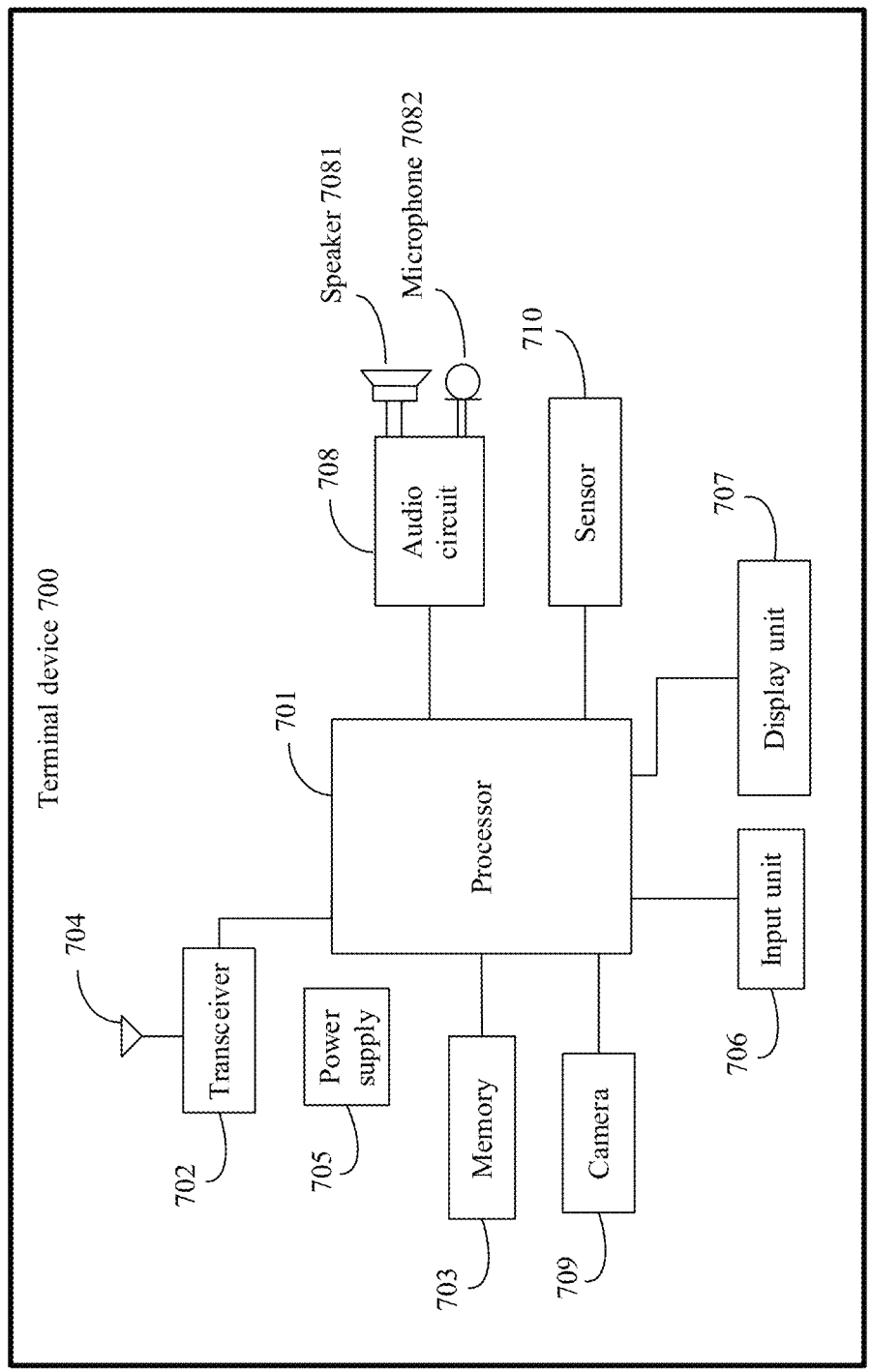
FIG. 7 is a schematic diagram of a structure of a terminal device according to this application.

FIG. 7 is a schematic diagram of a structure of a terminal device according to this application. As shown in FIG. 7, a terminal device 700 may be the terminal device in the foregoing embodiments. The terminal device 700 includes a processor 701 and a transceiver 702.

Optionally, the terminal device 700 further includes a memory 703. The processor 701, the transceiver 702, and the memory 703 may communicate with each other through an internal connection path, to transfer a control signal and/or a data signal.

The memory 703 is configured to store a computer program. The processor 701 is configured to execute the computer program stored in the memory 703, to implement each function in the foregoing apparatus embodiments.

Specifically, the processor 701 may be configured to perform an operation and/or processing performed by the processing module 503 in an apparatus embodiment (for example, FIG. 5), and the transceiver 702 is configured to perform an operation and/or processing performed by the receiving module 501.

Optionally, the memory 703 may alternatively be integrated into the processor 701, or may be independent of the processor 701.

Optionally, the terminal device 700 may further include an antenna 704, configured to transmit a signal output by the transceiver 702. Alternatively, the transceiver 702 receives a signal through the antenna.

Optionally, the terminal device 700 may further include a power supply 705, configured to supply power to various components or circuits in the device.

In addition, to improve a function of the terminal device, the terminal device 700 may further include one or more of an input unit 706, a display unit 707 (which may also be considered as an output unit), an audio circuit 708, a camera 709, a sensor 710, and the like. The audio circuit may further include a speaker 7081, a microphone 7082, or the like. Details are not described again.

This application further provides a computer-readable storage medium. The computer-readable storage medium stores a computer program. When the computer program is executed by a computer, the computer performs a step and/or processing in any one of the foregoing method embodiments.

This application further provides a computer program product. The computer program product includes computer program code. When the computer program code runs on a computer, the computer is enabled to perform a step and/or processing in any one of the foregoing method embodiments.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected according to an actual requirement to achieve the objectives of the solutions of the embodiments. In addition, in the accompanying drawings of the apparatus embodiments provided in this application, connection relationships between the modules indicate that the modules have communication connections with each other, which may be specifically implemented as one or more communication buses or signal cables.

Based on the descriptions of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any function performed by a computer program can be easily implemented by using corresponding hardware, and a specific hardware structure used to achieve a same function may be of various forms, for example, in a form of an analog circuit, a digital circuit, an application-specific circuit, or the like. However, for this application, a software program implementation is a better implementation in most cases. Based on such an understanding, the technical solutions of this application essentially or the part contributing to a current technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device to execute the methods described in embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or the functions according to embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, computing device, or data center to another website, computer, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a training device or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing in the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

In addition, the terms "system" and "network" are usually used interchangeably in this specification. The term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and unit, refer to a corresponding process in the method embodiment. Details are not described herein again.

In the several embodiments provided in this application, it should be understood that the disclosed system, apparatus, and method may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods of embodiments of this application.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A method for detecting a terminal device in an idle state, wherein the method is applied to the terminal device, and the method comprises:

receiving a first system message, wherein the first system message comprises a first field, and the first field is used to indicate the terminal device in the idle state to periodically initiate random access; and sending, by the terminal device in the idle state, a random access request to a network device based on the first field to enter a connected state, wherein the sending, by the terminal device in the idle state, a random access request to a network device based on the first field to enter a connected state comprises sending, by the terminal device in the idle state, the random access request to the network device periodically with a period of a first time period based on a first time period identifier, wherein the first field comprises the first time period identifier.

2. The method according to claim 1, wherein after the sending, by the terminal device in the idle state, a random access request to a network device to enter a connected state, the method further comprises:

receiving a first instruction sent by the network device; and entering, by the terminal device in the connected state, the idle state according to the first instruction.

3. The method according to claim 1, wherein the first system message further comprises a second field, the second field comprises a second time period identifier indicating a second time period, wherein the second time period is a duration in which the terminal device remains in the connected state after random access succeeds.

4. The method according to claim 3, wherein after the sending, by the terminal device in the idle state, a random access request to a network device based on the first field to enter a connected state, the method further comprises:

receiving a first instruction sent by the network device, wherein the first instruction is used to indicate the terminal device in the connected state to enter the idle state.

5. The method according to claim 3, wherein after the sending, by the terminal device in the idle state, a random access request to a network device based on the first field to enter a connected state, the method further comprises:

sending a second instruction to the network device based on the second time period identifier after the terminal device enters the connected state for the second time period, wherein the second instruction is used to indicate the network device to release the terminal device in the connected state, to enable the terminal device to enter the idle state.

6. The method according to claim 1, wherein the random access request further comprises a third field, and the third field is used to indicate the network device to release the terminal device in the connected state after the terminal device enters the connected state for a third time period, to enable the terminal device to enter the idle state.

7. A network device, comprising:

a transmitter configured to send a first system message, wherein the first system message comprises a first field, and the first field is used to indicate a terminal device in an idle state to periodically initiate random access; and a receiver configured to receive a random access request sent by the terminal device in the idle state to enter a connected state, wherein the first field comprises a first time period identifier, and the first time period identifier is used to indicate the terminal device to send the random access request to the network device periodically with a period of a first time period.

8. The network device according to claim 7, wherein:

the transmitter is further configured to send a first instruction to the terminal device, wherein the first instruction is used to indicate the terminal device in the connected state to enter the idle state.

9. The network device according to claim 7, wherein the first system message further comprises a second field, the second field comprises a second time period identifier indicating a second time period, wherein the second time period is a duration in which the terminal device remains in the connected state after random access succeeds.

10. The network device according to claim 9, wherein:

the transmitter is further configured to send a first instruction to the terminal device based on the second time period identifier after the terminal device enters the connected state for the second time period, wherein the first instruction is used to indicate the terminal device in the connected state to enter the idle state.

11. The network device according to claim 9, wherein the receiver is further configured to receive, based on the second time period identifier after the terminal device enters the connected state for the second time period, a second instruction sent by the terminal device, wherein the second instruction is used to indicate the network device to release the terminal device in the connected state, to enable the terminal device to enter the idle state.

12. A terminal device, comprising:

a receiver configured to receive a first system message, wherein the first system message comprises a first field, and the first field is used to indicate the terminal device in an idle state to periodically initiate random access; and a transmitter configured to send, by the terminal device in the idle state, a random access request to a network device based on the first field to enter a connected state, wherein the transmitter is further configured to send, by the terminal device in the idle state, the random access request to the network device periodically with a period of a first time period based on a first time period identifier, wherein the first field comprises the first time period identifier.

13. The terminal device according to claim 12, wherein:

the receiver is further configured to receive a first instruction sent by the network device; and the terminal device comprises at least one processor configured to enter the idle state from the connected state according to the first instruction.

14. The terminal device according to claim 12, wherein the first system message further comprises a second field, the second field comprises a second time period identifier indicating a second time period, and the second time period is duration in which the terminal device remains in the connected state after random access succeeds.

15. The terminal device according to claim 14, wherein:

the receiver is further configured to receive a first instruction sent by the network device, wherein the first instruction is used to indicate the terminal device in the connected state to enter the idle state.

16. The terminal device according to claim 14, wherein:

the transmitter is further configured to send a second instruction to the network device based on the second time period identifier after the terminal device enters the connected state for the second time period, wherein the second instruction is used to indicate the network device to release the terminal device in the connected state, to enable the terminal device to enter the idle state.

17. The terminal device according to claim 12, wherein the random access request further comprises a third field, and the third field is used to indicate the network device to release the terminal device in the connected state after the terminal device enters the connected state for a third time period, to enable the terminal device to enter the idle state.

* * * * *

UNITED STATES PATENT AND TRADEMARK OFFICE
CERTIFICATE OF CORRECTION

Page 1 of 1

PATENT NO. : 12,363,764 B2
APPLICATION NO. : 17/748651
DATED : July 15, 2025
INVENTOR(S) : Jing Xiong It is certified that error appears in the above-identified patent and that said Letters Patent is hereby corrected as shown below:

On the Title Page

In Column 2 (Other Publications), In Line 2, Delete "3GPPTSG-" and insert -- 3GPP TSG- --.

Signed and Sealed this
Twenty-third Day of December, 2025

John A. Squires
*Director of the United States Patent and Trademark Office*